Figure 4:
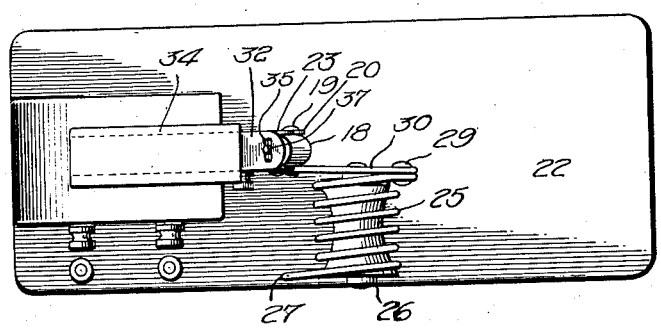

Jan. 8, 1935.  H. L. NEWMAN ET AL  1,987,153
FRAUD PREVENTING SYSTEM FOR ELECTRIC METERS
Filed April 19, 1933   2 Sheets-Sheet 1
Fig. 1.
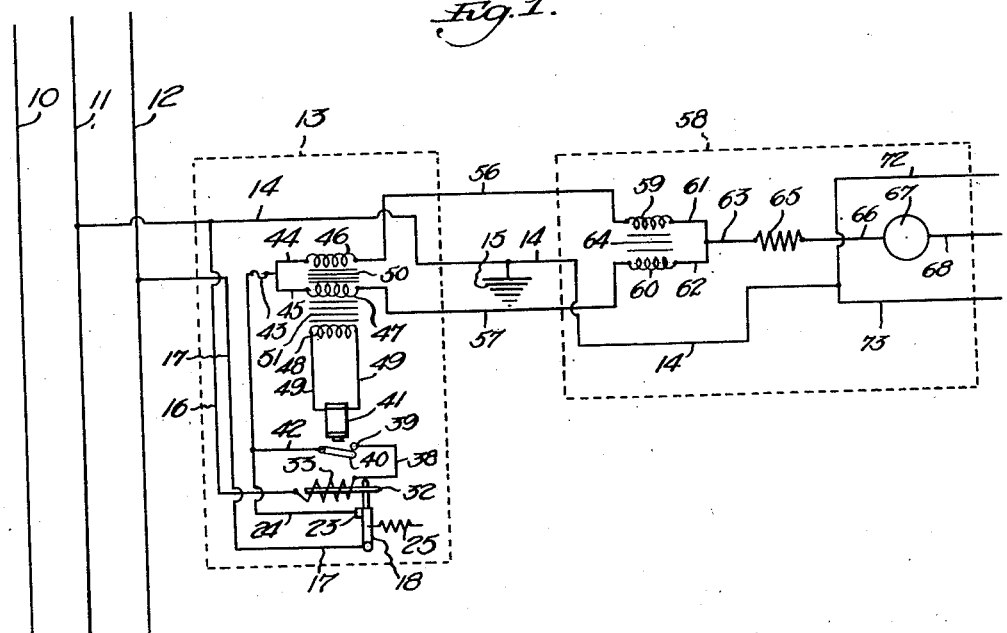
Fig. 2.
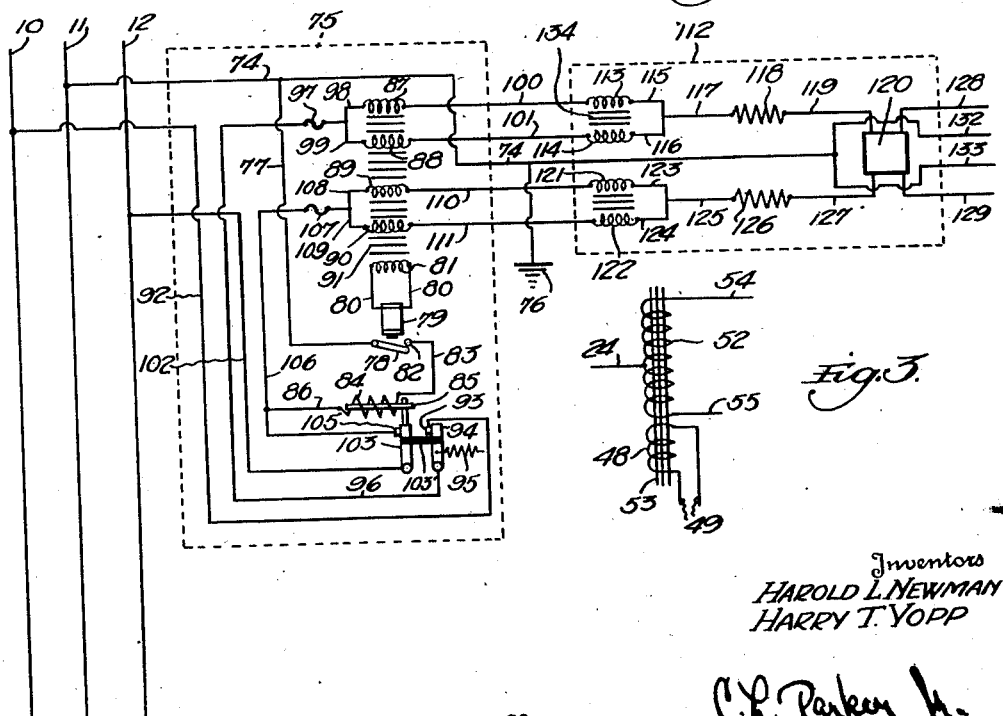
Fig. 3.
Inventors
HAROLD L. NEWMAN,
HARRY T. YOPP
By C. L. Parker Jr.
Attorney Jan. 8, 1935.  H. L. NEWMAN ET AL  1,987,153
FRAUD PREVENTING SYSTEM FOR ELECTRIC METERS
Filed April 19, 1933   2 Sheets-Sheet 2

Inventors
HAROLD L. NEWMAN
HARRY T. YOPP

Patented Jan. 8, 1935

1,987,153

UNITED STATES PATENT OFFICE 1,987,153

FRAUD PREVENTING SYSTEM FOR ELECTRIC METERS

Harold L. Newman and Harry T. Yopp, Atlanta, Ga.

Application April 19, 1933, Serial No. 666,922

17 Claims. (Cl. 171—34)

This invention relates to fraud preventing systems for electric meters.

It is well known that unscrupulous persons frequently resort to various means for preventing the metering of electric current consumed in homes and industrial buildings. Such fraudulent use of current may be accomplished in a number of ways the most common of which consist in shunting around the meter or tapping the wires ahead of the meter. These methods of fraudulently consuming electric current may be very easily practiced, it being merely necessary in the former case to connect lead wires around the meter to prevent the passage of current therethrough. With such system, none of the current consumed will be registered on the meter so long as the wires shunt around the meter, and it is the common practice for unscrupulous persons using such system to shunt around the meter only for a portion of the time between meter readings so that the fraudulent use of current will not be readily apparent.

The practice of tapping the lead-in wires ahead of the meter is quite prevalent since it provides means whereby a portion of the lights or other consuming devices of a building may be permanently supplied with current fraudulently obtained. The remaining current consuming devices of the building may be permanently supplied with current flowing through the meter so that the consumption of a regular portion of the current will be registered and fraud detection is thus rendered difficult. The method just referred to is particularly easy to practice in buildings where the line wires enter a substantial distance from the meter as, for example, in homes where the line wires enter through the attic while the meter is located in the cellar or basement. It is impossible to estimate the losses sustained by power companies through the fraudulent use of current, but it is well known that such losses are substantial and that they constitute a matter of serious consideration.

Numerous attempts have been made to prevent the fraudulent use of current but, so far as we are aware, such prior methods have been open to numerous objections which rendered their use largely undesirable or impracticable. For example, several of the prior methods suggested for this purpose have been disadvantageous because of the serious drop in potential across the meter involved, through the use of the current consuming means necessary for the operation of the system. Moreover, most prior systems do not prevent or indicate the use of current obtained by tapping the lead-in wire ahead of the meter, and most prior devices, if satisfactorily operable at all, merely indicate the fraudulent use of current without acting as a preventative. Such systems are of little practical use in view of the reluctance of power companies to make accusations of fraudulent use with no other evidence than the mere operation of an indicator which might be subject to accidental operation.

An important object of the present invention is to provide a novel system of preventing the fraudulent use of electric current by shunting around the meter or tapping the line wires ahead of the meter, or by any other of the known ways in which electric current may be fraudulently consumed.

A further object is to provide a system of the character referred to which is operative for positively disconnecting a house or other circuit from the line wires promptly upon the completion of an attempt to consume current which is not properly metered.

A further object is to provide a system of fraud prevention which includes an automatic switch inaccessible to the consumer and operable for disconnecting consuming circuits from the line wires when current is fraudulently consumed.

A further object is to provide a system of the character just referred to wherein the automatic switch is normally biased to open position and is released for movement to such position upon the fraudulent use of current, and which requires the services of an operator from a power company before the circuit can be restored.

A further object is to provide a fraud preventing system of the character indicated which is wholly practicable in operation without any appreciable drop in potential across the meter.

A further object is to provide a system of the character referred to which is operable with a minimum consumption of current, and wherein the current consumed does not pass through the consumer's meter.

A further object is to provide a fraud prevention system wherein divided circuits are employed which remain balanced during the consumption of current all of which passes through the meter, and which become promptly unbalanced upon a fraudulent attempt to consume current which does not pass through the meter, and to provide means operative upon the unbalancing of the circuits for disconnecting the consuming circuits from the line wires.

Other objects and advantages of the invention will become apparent during the course of the following description.

Figure 5:
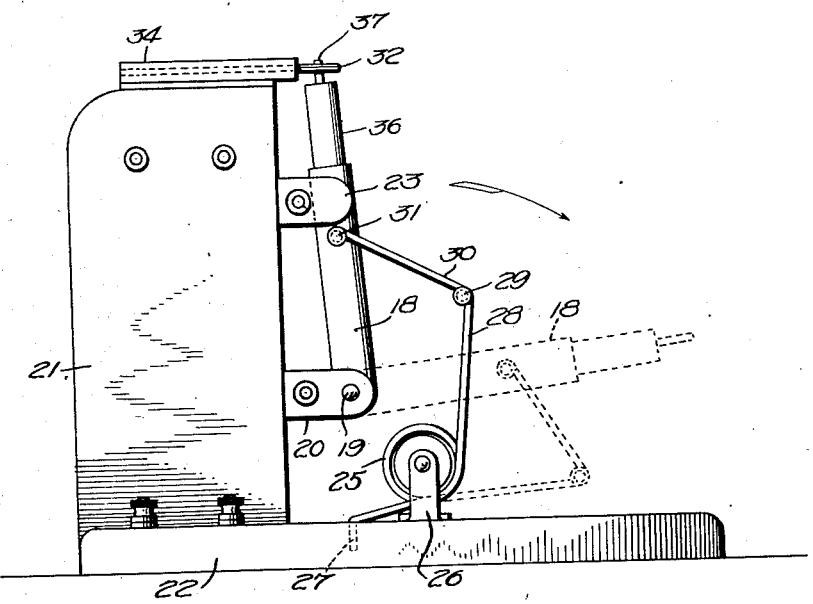

In the drawings we have shown several embodiments of the invention. In this showing, Figure 1 is a diagrammatic view illustrating one form of fraud preventing system, Figure 2 is a modified form of system, Figure 3 is a detail diagrammatic view of a modified form of differential transformer, Figure 4 is a plan view of an automatic switch particularly adapted for use in connection with the present invention, and, Figure 5 is a side elevation of the same.

Referring to Figure 1, the numerals 10, 11 and 12 designate the usual line wires, the center wire 11 being the so-called "neutral" wire. In ordinary house and similar circuits, the difference in potential of 110 volts exists across the wires 10 and 11 and across the wires 11 and 12. The line wires referred to are adapted to supply alternating current, and it will become apparent that the system is operative for substantially any voltages, or for single or polyphase installations.

The numeral 13 designates a suitable box which may be mounted on the pole from which the feed wires lead into a building, although it will become apparent that the box may be mounted at any point inaccessible to the consumer. A wire 14 is connected to the neutral wire 11 and leads through the box 13, being grounded in accordance with standard practice at any suitable point as at 15. A wire 16 is tapped into the wire 14 within the box 13 for a purpose to be described.

In the present instance, current is supplied from the line wires through the wire 14 and through a second wire 17 connected to the wire 12 and leading into the box 13. The wire 17 is connected to the arm 18 of an automatic switch shown in detail in Figures 4 and 5. The switch arm 18 is pivotally connected as at 19 to a bracket 20 projecting outwardly from a block 21 preferably formed of insulating material and mounted upon a base 22, preferably formed of similar material. The switch arm 18 engages contacts 23 connected to a wire 24 to be referred to later. A relatively strong spring 25, preferably of the torsion type, is suitably supported by brackets 26 mounted on the base 22. This spring has one end 27 engaging the base 22 and has its other end 28 connected as at 29 to one end of a link 30. The opposite end of this link is connected as at 31 to the switch arm 18, preferably at a point spaced a substantial distance from the pivot 19. The spring 25 normally biases the switch arm 18 to the dotted line position shown in Figure 5.

A thermostat 32, preferably in the form of a bi-metallic strip, is mounted above the block 21 and is surrounded by a heating coil 33, as shown in Figure 1. This coil is encased as at 34, and the casing 34 is secured at one end to the upper end of the block in any suitable manner. The opposite end of the thermostat 32 projects beyond the edge of the block 21 and is provided with an opening 35. The switch 18 is provided at its upper end with a handle 36 of wood or other insulating material, and a pin 37 projects from the end of the handle 36. The pin 37 normally is arranged within the opening 35 to prevent the switch 18 from opening, and is released upon upward movement of the free end of the thermostat due to the heating thereof in a manner to be described.

As previously stated, one end of the heating coil 33 is connected to the wire 16, while the other end of this coil is connected by a wire 38 to a contact 39. This contact is adapted to be engaged by the armature 40 of a relay coil 41 upon energization of the latter in a manner to be referred to, and the armature 40 is connected by a wire 42 to the wire 24. If desired, a fuse 43 may be connected in the wire 42, and this wire divides as at 44 and 45 for connection respectively with the primary coils 46 and 47 of a differential transformer. This transformer has a secondary 48 the lead wires 49 of which are connected to the terminals of the relay coil 41. The differential transformer is illustrated as being provided with two cores 50 and 51, but it will be apparent that only one core is used in actual practice, and that the three coils of the transformer are wound on such core.

A somewhat modified form of transformer is illustrated in Figure 3, and this transformer is highly advantageous in use. A single primary coil 52 is wrapped on a core 53 and is provided with terminal wires 54 and 55, the wire 24 being tapped into this coil intermediate its ends. It will be apparent that the current through the wire 24 divides for passage through the two end portions of the coil 52 on opposite sides of the tap, and the primary is tapped preferably to one side of the center thereof for a purpose to be described. This form of transformer utilizes the same secondary coil 48 previously described.

Referring to Figure 1, the numerals 56 and 57 designate wires from the terminals of the primary coils 46 and 47 leading from the box 13. These wires, together with the wire 14, lead into a box 58 located in the building where the meter normally is arranged. The wires 56 and 57 are connected respectively to coils 59 and 60, and these coils have their other ends connected to wires 61 and 62 leading to a common wire 63 to which they are connected. The coils 59 and 60 are wound on a core 64.

The wire 63 leads to one end of a small resistance 65, and the other end of this resistance is connected by a wire 66 to a standard meter 67. A wire 68 leads from the meter, out of the building. The box 58, into the interior of the building. The wire 14 leads into the box 58, as previously stated, and divides to form branch wires 72 and 73 leading from the box 58 into the interior of the building. It will become apparent that only one wire need lead from the box 58 in addition to the meter wire 68, but it is preferred that the branch wires 72 and 73 be employed in order that the number of wires leaving the box 58 may be the same as the number of wires entering the box. This arrangement is confusing to unscrupulous persons attempting to fraudulently obtain current, but it is not necessary that the load be balanced between the wire 68 and the respective wires 72 and 73. In other words, any desired loads may be connected across the wire 68 and the respective wires 72 and 73 for the legitimate use of current without causing operation of the present invention to open the main circuit.

In standard supply circuits a difference in potential of 110 volts exists across the line wires 10 and 11 and across the wires 11 and 12 and the system illustrated in Figure 1 is operative where the consumer's circuit is supplied across either the wires 10 and 11 or the wires 11 and 12. In Figure 2 of the drawings the system is illustrated as applied to a 220 volt three wire installation. In such system the theory of operation to be referred to later is identical with that of the system illustrated in Figure 1 except that the parts are largely duplicated. Referring to Figure 2, a wire 74 leads into a box 75 similar in construction and location to the box 13. The wire 74 leads from the box 75, as shown, and is suitably grounded as at 76. Within the box 75, a wire 77 is connected at one end to the wire 74 and has its other end connected to the armature 78 of a relay coil 79. The terminals of the relay coil are connected by wires 80 to the terminals of a differential transformer secondary coil 81, similar to the coil 48 previously described. Upon energization of the relay, the armature 78 is attracted into engagement with a contact 82 connected to one end of a wire 83, and the other end of this wire is connected to one terminal of a heating coil 84. This coil surrounds a thermostat 85, preferably of the bi-metallic strip type, and the other end of the heating coil is connected to a wire 86.

The differential transformer in Figure 2 is provided with two pairs of primary coils, the first pair being designated by the numerals 87 and 88, and the second pair by the numerals 89 and 90. The primary coils are all wound preferably on the same core 91. A wire 92 is connected to the line wire 10 and leads to a contact 93 normally engaged by a switch arm 94. The switch arm is normally urged away from the contact 93 by a spring 95, and is held in engagement with the contact in a manner to be described. A wire 96 is connected at one end to the switch arm 94 and preferably has a fuse 97 arranged therein. Beyond the fuse, the wire 96 is connected to branch wires 98 and 99 connected respectively to the coils 87 and 88, and these coils have lead wires at their other ends leading from the box 75 as indicated by the numerals 100 and 101.

A wire 102 is connected to the wire 12 and leads to a switch arm 103 similar to the switch arm 94 and normally engaging a contact 105. The switch arm 103 is identical with the arm 18, having an upstanding finger engaging the thermostat 85 to normally hold the switch in closed position. The switches 94 and 103 are connected by a link 103', preferably formed of insulating material, to cause simultaneous movement of the switch arms. The contact 105 is connected to one end of a wire 106, and the wire 86 is connected to the wire 106 intermediate the ends thereof. A fuse 107 is preferably connected in the wire 106, and beyond the fuse the wire 106 is connected to branch wires 108 and 109 leading to the coils 89 and 90. The other ends of these coils are connected respectively to the wires 110 and 111 leading from the box 75.

The wires 74, 100, 101, 110 and 111 lead into a box 112 similar to the box 58 previously described. The wires 100 and 101 are connected respectively to coils 113 and 114 having their ends leading to branch wires 115 and 116 connected to a common wire 117. This wire leads to one end of a resistance 118, from which current passes over wire 119 to a meter 120.

In a similar manner, the wires 110 and 111 lead to coils 121 and 122 having their ends connected to branch wires 123 and 124 connected to a common wire 125. This wire, in turn, leads to one end of a resistance coil 126 from which a wire 127 leads to the meter 120. "Hot wires" 128 and 129 lead from the meter and from the box 112, as shown. The neutral wire 74 leads into the box 112 and is connected to branch wires 132 and 133 leading from the box 112. The coils 113, 114, 121 and 122 may be wound upon a single core 134.

The operation of the system illustrated in Figure 1 is as follows:

As previously stated, the system operates on alternating current, and the present description will be based on the assumption that the current is flowing in one direction. In other words, the operation during the flow of one current impulse will be described. The current flows from line wire 12 through wire 17 to the switch arm 18 which is normally held in closed position against the tension of the spring 25 by the thermostatic element 32. Accordingly current will flow through contact 23, wire 24 and fuse 43, and thence through the branch wires 44 and 45 and their respective primary coils 46 and 47. The ampere turns of these coils are equal and opposite whereby they neutralize each other, and accordingly no net flux will be generated in the core of the differential transformer and the magnet 41 will be deenergized. Under such conditions, the armature switch 40 will remain open and no current will flow through the heating coil 33.

The current obviously divides through the coils 46 and 47 and then flows through wires 56 and 57, coils 59 and 60 and wires 61 and 62. These wires are connected to the common wire 63, and current flows through this wire, through resistance 65, wire 66, meter 67 and wire 68. The flow of current described takes place if a load is connected across the wires 68 and 72, across wires 68 and 73, or across both sets of wires.

After passing through the load, the current returns through wires 72 and/or 73, wire 14 and neutral wire 11. The ampere turns of the coils 59 and 60 are equal and opposite whereby the coils neutralize each other, and thus no net flux flow will be set up in the core of the differential choke coils. The drop in potential across the outlet wires due to the use of the small resistance 65 is negligible.

As previously stated, the present system is unaffected by the relationship of the loads connected across the wire 68 and wire 72 and across the wires 68 and 73, but a wholly different result follows if an unscrupulous person attempts to utilize current which is not metered, either by shunting around the meter or by tapping the wires ahead of the meter. As previously stated, the box 58 is located within the building or at any point where the meter ordinarily would be placed, while the box 13 is arranged at an inaccessible point, preferably on the light pole. For connecting the elements within the two boxes, it is desirable in practice that a two conductor concentric cable be employed to render it more difficult to tap the wires, although the operation of the system is not dependent on the use of any particular form of lead wires.

If an unscrupulous person attempts to shunt around the meter, there will be no way in which he can determine which wires to connect, and if either of the wires 56 or 57 is connected to either of the wires 72 or 73, a short circuit obviously will result, thus immediately burning out the fuses. The same result will follow if an attempt is made to connect the wires 14 and 68. If a load is connected across either the wires 14 and 57 or 14 and 56, no fuses will be blown, but the switch will be caused to open.

Assuming that a load is connected across the wires 14 and 57, it will become apparent that the coils 46 and 47 will be immediately unbalanced, thus generating a flow of flux through the core of the differential transformer. Under the conditions referred to, current at a given instant will flow through the primary transformer coil 47, through wire 57, through the load and thence through the neutral wire 14. At the same time, current will flow through transformer coil 46, wire 56, through the coils 59 and 60 in series, through wire 57, through the load and thence through wire 14. As previously stated, the ampere turns of coils 59 and 60 are equal and opposite and this is true during legitimate use of current at the outlet side of the meter, but under the conditions being considered, the effects of the coils 59 and 60 would be added to each other, whereby both act as choke coils. This double choking effect would occur in the circuit of the primary coil 46, whereas substantially no resistance would exist in the circuit of coil 47, and thus the coils 46 and 47 would be unbalanced. This condition would cause the flow of a net flux in the core of the transformer to generate a current in the circuit of the secondary coil 48. The relay coil 41 will then become energized to attract its armature 40, thus moving the latter into engagement with the contact 39 to close the circuit through the heating coil 33. This circuit is closed through wire 17, switch 18, wires 24 and 42, through the switch 40, wire 38, coil 33, and wires 16 and 14.

The closing of this circuit obviously heats the coil 33, and the thermostatic element 32 is caused to bend upwardly to release the upper end of the finger 37, whereupon the spring 25 moves the switch 18 to open position. The entire circuit to the building thus will be opened, and since the consumer of the current has no access to the box 13, he cannot restore the circuit but is forced to notify the power company in order that an operator may be sent out to open the box 13 and close the switch 18. In actual practice, it has been found that the switch 18 will open if an unbalanced load of the character referred to remains in operation for approximately three seconds.

Assuming that the primary coils 46 and 47 are separate coils, their windings obviously will neutralize each other. If such system is employed, it will be apparent that equal loads may be simultaneously connected across the wires 14 and 56 and wires 14 and 57 without unbalancing the coils 46 and 47, in which case the system would not operate. Such loads, however, would have to be simultaneously connected since, as previously stated, the switch 18 opens in approximately three seconds after the balance between the coils 46 and 47 is disturbed. Moreover, the use of almost exactly equal loads across the wires 14 and 56 and 14 and 57 would be required to prevent the opening of the switch 18, and such fraudulent use of current would be highly impracticable.

The transformer shown in Figure 3 is such that the system will operate perfectly if equal loads are connected across the points indicated. A single primary coil 52 is employed, and the wire 24 is tapped into the coil 52 intermediate the ends of the latter and at a point spaced from its center. Under such conditions, the two primary coils thus provided will be equal in ampere turns if loads are connected in the circuit beyond the meter. These primary coils, however, will be promptly unbalanced by having their ampere turn relationship destroyed if a load is connected, for example, across the wires 14 and 57, thus generating a flux flow to induce current in the secondary coil 48. In view of the fact that the wire 24 is not tapped into the coil 52 centrally thereof, current cannot be fraudulently used by connecting equal loads across the wires 14 and 56 and 14 and 57, and such fraudulent use of current could be obtained only by employing respective loads bearing the same relationship as the turns of the two primary coils into which the coil 52 is divided. The relationship between the primary coils of the transformer shown in Figure 3 is not subject to any particular limitations and may be of such character as to make it substantially impossible to employ loads ahead of the meter in the same ratio as the primary transformer coils. For example, the turns of the primary coils may be in the ratio of 2 to 1, 2½ to 1, 2⅞ to 1, etc., and if desired, different apparatus may be made with primary transformer coils of different ratios.

If an attempt is made to use current fradulently by shunting around the meter by a wire connected between the wire 68 and either wire 56 or 57, a disturbance in the normal flow of current will occur to unbalance the coils 46 and 47 and thus cause the relay coil 41 to be energized to break the circuit through the switch 18. For example, if a shunt is connected between the wire 56 and the wire 68, the coil 60 becomes the primary coil of a current transformer upon the connection of a load across the wire 68 and, for example, the wire 72. Under such conditions, current will flow through coil 60, wires 62 and 63, resistance 65, through the wire 66, meter 67, wire 68 and through the load, and thence through wire 72, and wire 14. The coil 60 thus generates a current through the coil 59 and its associated wires and through the shunt connected around the box 58, and if the resistance of such secondary circuit were substantially zero, the secondary current would be substantially equal to the primary current in the circuit of the coil 60. Under such conditions, there would be no net flux in the core 64, and the coils 59 and 60 would remain balanced. In other words, such result would follow if the shunt were connected between the wires 56 and 63, but the latter wire is not available for the reason that it is enclosed within the box 58, and a shunt around the meter box accordingly necessarily includes the resistance 65 if the shunt is connected in the manner previously described, namely, between the wires 56 and 68. The resistance 65 is relatively low, and its effect on the current flowing through the coil 60 is negligible. However, the introduction of the resistance into the circuit of the coil 59 and the shunt connected around the meter box reduces the secondary current generated in such circuit by the primary coil 60.

Of course, the current flowing over wire 56 divides through the shunt wire and the coil 59, but this does not affect the reduction of the net current in the circuit of the coil 59 and the shunt connection, since the greater the normally divided current that flows through the coil 59, the less will be the current through the coil 59 generated by the primary coil 60. The unbalancing of the coils 59 and 60 thus results in the generation of flux in the core 64 whereby the coil 60 is caused to act as a choke to reduce the current in the line including the differential transformer coil 47 and the coil 60. The reduction in the resistance of the circuit including the coil 46 and wire 56 through the use of the shunt connection thus results in the substantial unbalancing of the coils 46 and 47 whereupon flux is generated in the differential transformer core to cause the generation of current in the circuit of the secondary coil 48 and its relay 41. Under such conditions the circuit through the switch 18 will be broken in the manner previously described.

The foregoing result covers the shunting across the wires 56 and 68, and obviously the same result would follow the connection of a shunt wire between the wires 57 and 68. The only difference would be that the coil 59 would become a transformer primary coil to generate current in the circuit including the coil 60 and the shunt connection, whereupon the coil 59 would act as a choke and the coils 46 and 47 would become unbalanced. Obviously a shunt between the wire 14 and either of the wires 72 and 73 could have no effect whatever since all of these wires are, in effect, the same wire constituting one side of the line. As previously stated, any shunt connection between wires 56 and 57 and wires 72 and 73 would result in a short circuit and burn the fuse 43.

The operation of the system illustrated in Figure 2 is similar to the operation of the system previously described and need not be referred to in detail. It will be apparent that a difference in potential of 110 volts exists across the wires 128 and 132 and across the wires 129 and 133, the difference in potential across the wires 128 and 129 being 220 volts in accordance with standard three wire installations. Any attempt to fraudulently consume current with such system will result in the opening of the circuits in the box 75 as in the previous case. For example, a load across the neutral wire 74 and either wire 100 or 101 will unbalance the coils 87 and 88, while the coils 89 and 90 will be unbalanced by introducing a load across the wire 74 and either wire 110 or 111. The unbalancing of either pair of primary coils generates a flux in the transformer core to induce current in the circuit of the secondary coil 81, thus energizing the relay coil 79 and moving the armature 78 into engagement with the wire 82. This action closes the circuit through the heating coil 84 to move the thermostatic element 85 upwardly, and release the switch 103, this switch being identical with the switch 18 previously described. The divided circuits through the primary coils 87 and 88 receive their current through the switch arm 94, while the switch 103 is in the line of the primary coils 89 and 90. The two switches referred to are connected together for simultaneous operation, and since the thermostatic element 85 will be operated upon the unbalancing of either pair of primary coils, both switches 94 and 103 will be opened by the spring 95 upon any attempt to consume current fraudulently.

From the foregoing, it will be apparent that the present system is highly advantageous for the reason that any fraudulent use of current will result in the complete breaking of the circuit in a manner which will be unknown to the vast majority of consumers, and the automatic switch which breaks the circuit is not accessible and requires the services of an employee of the power company in order that service may be restored in the building. Thus the system acts as a positive means for preventing fraudulent use of current and requires that the power company be given knowledge of the attempt to fraudulently use current before service can be restored. Thus the power company is efficiently protected against losses and is not required to even locate the means through which the current consumer has attempted to defraud the meter. Any person attempting to use current fraudulently will be aware that he has in fact notified the power company of his actions through the necessity of having to secure the services of an employee of the company to restore the normal circuits, and it is hardly probable that he will make a second attempt of the same kind. Any further attempt to secure the same results by some different means of shunting the meter or tapping the wires ahead of the meter will have the same result.

While the movement of the thermostatic element 32 may be utilized merely as a signal to the power company of the attempt to consume current fraudulently, it will be apparent that the most efficient results are obtained by utilizing the thermostatic element as means for releasing an automatic switch whenever an attempt is made to consume current which does not flow through the meter. The parts of the apparatus are relatively inexpensive to manufacture and obviously the apparatus will save its cost to a power company many times over by preventing unscrupulous persons from consuming current for which they do not pay. Since only a small proportion of the users of electric current attempt to employ fraudulent means for securing current without cost, it is not contemplated that the present apparatus be connected in the service lines of all consumers, but only in lines where a power company suspects that fraud is being practiced.

While the apparatus has been described particularly as a system for preventing the fraudulent consumption of electric current, it will be noted that it possesses particular value in removing fire hazards. For example, if a ground occurs in lines 56 or 57 of as much as half an ampere, the unbalancing of the coils 46 and 47 will be sufficient to operate the relay and release the switch 18. This result occurs in the same manner as when an unscrupulous person taps the lines ahead of the meter. The portions of a building beyond the meter ordinarily are protected by fuses, but normally the lines between the meter box and the pole are not so protected, and many fires originate through the grounding of the line wires ahead of the meter. Accordingly the present device serves as a fire prevention means. A linesman, called out to reset the switch 18 will find that the switch will not remain closed if either of the lines 56 or 57 is grounded, and accordingly he will seek to find the cause of the operation of the relay 41, and accordingly will locate the ground.

The electrical values of the various portions of the apparatus are not critical, and the design of the parts depends largely upon the loads at which it is desired to have the switch 18 open. For example, in one embodiment of the apparatus, the coils 59 and 60 have been wound with forty and eighty turns respectively in which case a load of 60 watts connected across the line ahead of the meter is sufficient to operate the relay 41. If the resistance 65 is of the order of 0.2 ohm under such conditions, a load of 260 watts or more connected across the wire 68 and either wire 72 or 73, with the meter shunted in the manner previously described, will result in the operation of the relay 41. Obviously the loads at which the switch 18 will open, may be varied by changing the values of the various elements.

It is to be understood that the forms of the invention herewith shown and described are to be taken as preferred examples of the same and that various changes in the shape, size and arrangement of parts may be resorted to without depart-

We claim:

1. A system of the character described comprising a pair of electric transmission lines, one of said lines being divided to form a pair of branches, a transformer including a pair of balanced primary coils arranged in the respective branches and a secondary coil, a pair of balanced choke coils arranged in the respective branches, a power theft detecting device, an auxiliary circuit including said secondary coil, and means operable upon the generation of a current in said auxiliary circuit incident to the unbalancing of said primary coils for operating said detecting device.

2. A system of the character described comprising a pair of electric transmission lines, one of said lines being divided to form a pair of branches, a transformer including a pair of balanced primary coils arranged in the respective branches and a secondary coil, a pair of balanced choke coils arranged in the respective branches, a switch in one of said lines, an auxiliary circuit including said secondary coil, and means operative upon energization of said auxiliary circuit incident to the unbalancing of said primary coils for opening said switch.

3. A system of the character described comprising a pair of electric transmission lines, one of said lines being divided to form a pair of branches, a transformer including a pair of balanced primary coils arranged in the respective branches and a secondary coil, a pair of balanced choke coils arranged in the respective branches, a switch in one of said lines having a normal bias to open position, means normally holding said switch in closed position, an auxiliary circuit including said secondary coil, and means operative upon energization of said auxiliary circuit incident to the unbalancing of said primary coils for releasing said holding means.

4. A system of the character described comprising a pair of electric transmission lines, one of said lines being divided to form a pair of branches, a transformer including a pair of balanced primary coils arranged in the respective branches and a secondary coil, a pair of balanced choke coils arranged in the respective branches, a switch arranged in one of said lines and having a normal bias to open position, a thermostatic element normally latching said switch in closed position, a heating coil surrounding said thermostatic element, an auxiliary circuit including said secondary coil, and means operative upon energization of said auxiliary circuit incident to the unbalancing of said primary coils for energizing said heating coil to release said thermostatic element from said switch.

5. A system of the character described comprising a pair of electric transmission lines, one of said lines being divided to form a pair of branches, a transformer including a pair of balanced primary coils arranged in the respective branches adjacent one end thereof, a pair of balanced choke coils arranged in the respective branches adjacent the other end thereof, a meter connected in said last mentioned line beyond the last mentioned end of said branches, a resistance connected in said last mentioned line between said meter and the last mentioned end of said branches, said transformer further including a secondary coil, an auxiliary circuit including said secondary coil, a power theft detecting device, and means operative upon energization of said auxiliary circuit upon the unbalancing of said primary coils for operating said detecting device.

6. A system of the character described comprising a pair of electric transmission lines, one of said lines being divided to form a pair of branches, a transformer including a pair of balanced primary coils arranged in the respective branches adjacent one end thereof, a pair of balanced choke coils arranged in the respective branches adjacent the other end thereof, a meter connected in said last mentioned line beyond the last mentioned end of said branches, a resistance connected in said last mentioned line between said meter and the last mentioned end of said branches, said transformer further including a secondary coil, an auxiliary circuit including said secondary coil, a switch arranged in one of said lines, and means operative upon energization of said auxiliary circuit incident to the unbalancing of said primary coils for opening said switch.

7. A system of the character described comprising a pair of electric transmission lines, one of said lines being divided to form a pair of branches, a transformer including a pair of balanced primary coils arranged in the respective branches adjacent one end thereof, a pair of balanced choke coils arranged in the respective branches adjacent the other end thereof, a meter connected in said last mentioned line beyond the last mentioned end of said branches, a resistance connected in said last mentioned line between said meter and the last mentioned end of said branches, said transformer further including a secondary coil, an auxiliary circuit including said secondary coil, a switch arranged in one of said lines and having a normal bias to open position, means normally holding said switch in closed position, and means operative upon the generation of current in said auxiliary circuit incident to the unbalancing of said primary coil for releasing said holding means.

8. A system of the character described comprising a pair of electric transmission lines, one of said lines being divided to form a pair of branches, a transformer including a pair of balanced primary coils arranged in the respective branches adjacent one end thereof, a pair of balanced choke coils arranged in the respective branches adjacent the other end thereof, a meter connected in said last mentioned lines beyond the last mentioned end of said branches, a resistance connected in said last mentioned line between said meter and the last mentioned end of said branches, said transformer further including a secondary coil, an auxiliary circuit including said secondary coil, a switch arranged in one end of said lines, a relay having its coil arranged in said auxiliary circuit, an operating circuit including the armature of said relay, and means operative upon energization of said relay to close said operating circuit for opening said switch.

9. A system of the character described comprising a pair of electric transmission lines, one of said lines being divided to form a pair of branches, a transformer including a pair of balanced primary coils arranged in the respective branches adjacent one end thereof, a pair of balanced choke coils arranged in the respective branches adjacent the other end thereof, a meter connected in said last mentioned line beyond the last mentioned end of said branches, a resistance connected in said last mentioned line between said meter and the last mentioned end of said branches, said transformer further including a secondary coil, an auxiliary circuit including said secondary coil, a switch arranged in one of said lines and having a normal bias to open position, a thermostatic element normally latching said switch in closed position, a relay having its coil connected in said auxiliary circuit, a heating coil surrounding said thermostatic element and an operating circuit including said heating coil and the armature of said relay and energizable to cause said thermostatic element to release said switch upon energization of said auxiliary circuit incident to the unbalancing of said primary coils.

10. A system of the character described comprising a pair of electric transmission lines, one of said lines being divided to form a pair of electrically balanced branches, means for causing the electrical unbalancing of said branches upon the connecting of either of said branches to the other line, an interrupter in one of said lines, and means operable upon the electrical unbalancing of said branches for operating said interrupter.

11. A system of the character described comprising a pair of electric transmission lines, one of said lines being divided to form a pair of electrically balanced branches, means for causing the electrical unbalancing of said branches upon the connecting of either of said branches to the other line, a switch in one of said lines having a normal bias to open position, means normally holding said switch in closed position, and means operable upon the electrical unbalancing of said branches for releasing said holding means.

12. A system of the character described comprising a pair of electric transmission lines, one of said lines being divided to form a pair of electrically balanced branches, means for causing the electrical unbalancing of said branches upon the connecting of either of said branches to the other line, a switch in one of said lines having a normal bias to open position, a thermostatic element normally holding said switch in closed position, a heating element surrounding said thermostatic element, and means operable upon the electrical unbalancing of said branches for energizing said heating element to cause said thermostatic element to release said switch.

13. A system of the character described comprising a pair of electric transmission lines, one of said lines being divided to form a pair of electrically balanced branches, means for causing the electrical unbalancing of said branches upon the connecting of either of said branches to the other line, a switch in one of said lines having a normal bias to open position, means for normally holding said switch in closed position, a normally open control circuit for said holding means, and means operable upon the electrical unbalancing of said branches for energizing said control circuit to release said holding means.

14. A system of the character described comprising a pair of electric transmission lines, one of said lines being divided to form a pair of branches, a transformer including a pair of balanced primary coils in the respective branches and a secondary coil, means for unbalancing said primary coils upon the connecting of either of said branches to the other line, an auxiliary circuit including said secondary coil, a power theft detecting device, and means operable upon energization of said auxiliary circuit upon the unbalancing of said primary coils for operating said detecting device.

15. A system of the character described comprising a pair of electric transmission lines, one one of said lines being divided to form a pair of branches, a transformer including a pair of balanced primary coils in the respective branches and a secondary coil, means for unbalancing said primary coils upon the connecting of either of said branches to the other line, an auxiliary circuit including said secondary coil, a switch in one of said lines, and means operable upon the generation of a current in said auxiliary circuit incident to the unbalancing of said primary coils for opening said switch.

16. A system of the character described comprising a pair of electrical transmission lines, one of said lines being divided to form a pair of branches, a transformer including a pair of balanced primary coils in the respective branches and a secondary coil, means for unbalancing said primary coils upon the connecting of either of said branches to the other line, an auxiliary circuit including said secondary coil, a switch arranged in one of said lines and having a normal bias to open position, means normally holding said switch in closed position, and means operable upon the generation of a current in said auxiliary circuit incident to the unbalancing of said primary coils for releasing said holding means.

17. A system of the character described comprising a pair of electric transmission lines, one of said lines being divided to form a pair of branches, a transformer including a pair of balanced primary coils in the respective branches and a secondary coil, means for unbalancing said primary coils upon the connecting of either of said branches to the other lines, an auxiliary circuit including said secondary coil, a switch arranged in one of said lines and having a normal bias to open position, a thermostatic element constituting a latch holding said switch in closed position, a heating coil surrounding said thermostatic element, and means operable upon the generation of a current in said auxiliary circuit incident to the unbalancing of said primary coils for energizing said heating coil to cause said thermostatic element to release said switch.

HAROLD L. NEWMAN.
HARRY T. YOPP.